(No Model.)
J. W. V. RAWLINS.
FRICTION CLUTCH.
No. 377,777. Patented Feb. 14, 1888.
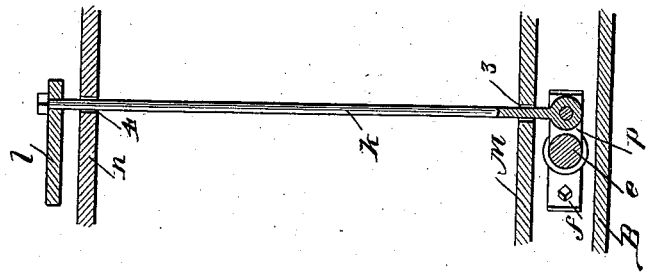
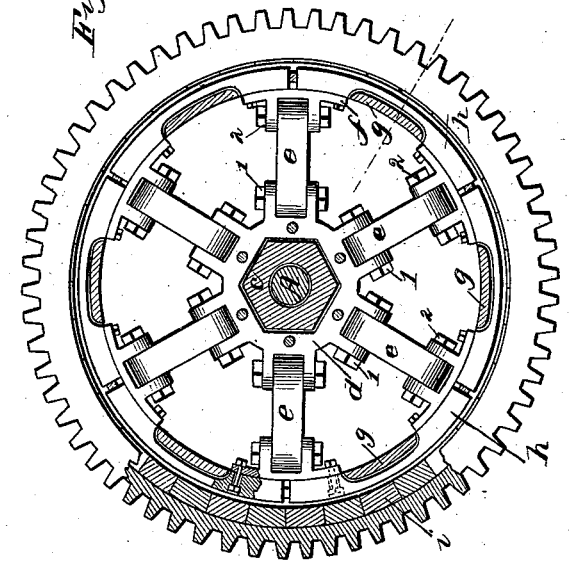
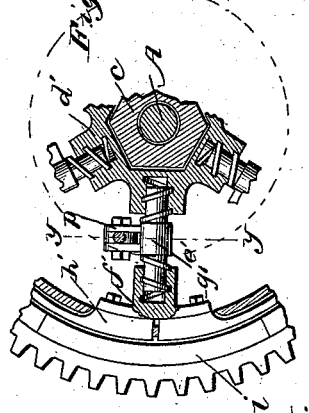
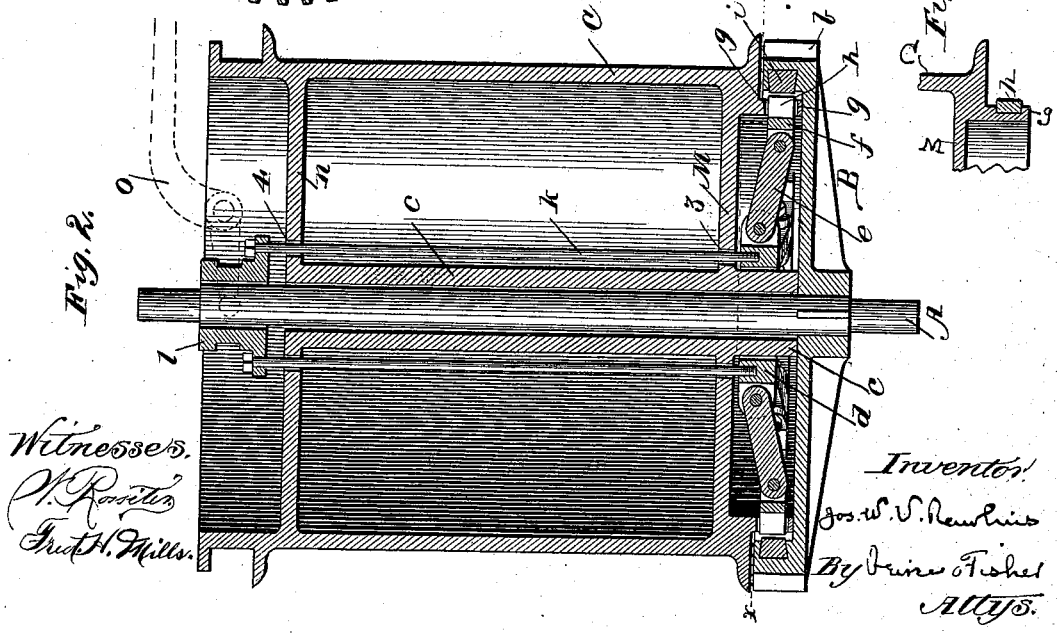

UNITED STATES PATENT OFFICE.

JOSEPH W. V. RAWLINS, OF HANCOCK, MICHIGAN.

FRICTION-CLUTCH.

SPECIFICATION forming part of Letters Patent No. 377,777, dated February 14, 1888.

Application filed June 6, 1887. Serial No. 240,391. (No model.)

*To all whom it may concern:*

Be it known that I, JOSEPH W. V. RAWLINS, of Hancock, in the county of Houghton, State of Michigan, have invented certain new and useful Improvements in Friction-Clutches, of which the following is hereby declared to be a full, clear, and exact description, sufficient to enable others skilled in the art to which said invention appertains to make and use the same.

My invention relates to clutches of that class wherein a constantly-revolving wheel is engaged or disengaged at will by means of friction-clutch, with a companion wheel or drum loosely set upon its shaft, and partaking of the movement of the driving-wheel through the medium of the clutch mechanism.

The invention has for its object to furnish a steady even connection between the driving wheel or pulley and the loosely-set companion wheel or drum, to which end the invention consists in certain improvements in the structure of the clutch mechanism, connecting the driving pulley or drum at will with the power wheel or pulley, the nature of which will appear from the following description, and be thereafter distinctly pointed out in the claims at the conclusion thereof.

In the accompanying drawings, forming part of this specification, Figure 1 is a view in elevation, on line x x of Fig. 2, of my improved friction-clutch applied to a hoisting-drum. Fig. 2 is a view in longitudinal central section of the hoisting-drum with the friction-clutch applied thereto. Fig. 3 is a detail view, partly in section and partly in elevation, of a modified form of the toggle mechanism forming part of the friction-clutch. Fig. 4 is a sectional view thereof on line y y of Fig. 3. Fig. 5 is a detail section of the drum flange and segment.

Keyed or otherwise firmly secured to the shaft A is the gear-wheel B, which in the form shown is furnished about its outer rim with the usual circumferential gear-teeth, b. Instead of being a gear-driver, the wheel B may be of the usual pulley form suited to a driving band or cable; or the shaft A may be driven by crank or pulley or other convenient means separately from the wheel B, in which event said wheel B will be employed merely as one part of the friction-clutch mechanism, now to be described.

The drum or pulley C is set loosely upon the shaft A and runs freely thereon without partaking of the movement of such shaft, except during the intervals when it is locked thereto by means of the clutch device. Next to the driver-wheel B the drum or pulley is furnished with an extension or hub, c, upon which is mounted the toggle-collar d. The hub c is preferably polygonal in form, to correspond with the form of the toggle-collar d, nicely fitted to slide thereon. By this expedient the toggle-collar d has a firm even bearing upon the hub c about its entire circuit, so that the hub, and consequently the drum C, can be stoutly gripped and rotated.

Instead of having the contiguous faces of the hub c and the toggle-collar d polygonal in counterpart, the collar may be secured to the hub by spline and key or like expedient, permitting the collar to slide freely along the hub at the same time that the hub and drum partake of the rotary movement of the collar.

Pivoted, as at 1, to the collar d are the toggle-arms e, which at their outer ends pivotally carry, as at 2, the toggle-blocks f. The toggle-blocks f are snugly fitted to pass within recesses or slots cast or cut at intervals about the circumferential flange g, projecting from the drum or wheel C. Around the outer face of the flange g are arranged the segments h, constituting one part of the clutch proper. These segments preferably break joint, as shown—that is, the adjacent segments are secured near their ends in common to the same toggle-block, f. The holes in the segments, through which the bolts pass to secure the segments to the common toggle-block, are made somewhat larger than the bolts, in manner to permit a slight lateral play or adjustment of the segments endwise to and from each other around the circuit of the flange and during the shift of the toggle-blocks, so that such shift may occur without strain or binding. The outer or bearing face of the series of segments h is turned to a true circuit, so as to furnish a smooth bearing for the clutch. Within an annular recess of the driver B is set the series of blocks i, constituting the lagging. The annular recess in the driver B is preferably dovetail in section, to better retain the lagging in place, and said lagging, together with the segments $h$, which contact therewith, are preferably made of wood, or the lagging of wood and the segments of iron, to afford a stout clutch or grip capable of replacement when the parts are worn by use. The projecting faces of the lagging $i$ are turned to a true perimeter concentric with that of the segments $h$. Rods $k$, secured at one end to the toggle-collar $d$, extend through the drum C, and are fastened at their opposite ends to the loose shipping collar $l$. The rods $k$ are preferably sustained, as at 3 4, in the heads M $n$ of the drum C. Upon operating the shipper-lever $o$, (dotted lines, Fig. 2,) the collar $l$ and rods $k$ shift the toggle-collar $d$ along its bearing upon the hub $c$, thus causing the toggle-levers $e$ to force outward the toggle-blocks $f$ and segments $h$, so that the latter bear at their friction-face against the lagging $i$. By this means the drum or wheel C is firmly clutched or locked with the driver B, and in consequence partakes of the rotary movement of said driver. The slots or recesses in the rim $g$ afford a snug guide and bearing for the segments $h$ and toggle-blocks $f$, so that these parts can stoutly withstand the strain when the clutch engagement is made. By reversing the shipper-lever $o$ the segments $h$ are withdrawn from contact with the lagging $i$ and the drum or pulley C thereupon released from revolution with the shaft A.

Instead of having the toggle-arms $e$ pivotally secured to the toggle-collar $d$ and toggle-blocks $f$, respectively, as already described, the toggle-arms may have screw-terminals of reverse thread, as at $e'$, Fig. 3, which terminals engage with correspondingly-threaded seats in the toggle-collar $d'$ and the toggle-blocks $g'$. In such event the shifting-rods $k$, extending through the drum C from the shipper-collar $l$, will be pivoted, as at $p$, to a lug or ear upon each of the toggle-arms $e'$. Upon imparting an endwise shift to the rods $k$ the toggle-arms $e'$ will be rotated partially about, throwing the toggle-blocks $g'$, and in consequence the segments $h'$, bolted thereto, toward or away from the lagging $i$. Whichever form of toggle-arm connection between the toggle-collar and toggle-block be employed, it is plain that the steady support of the toggle-blocks and segments by the recessed rim $g$ of the drum C is insured. The slight endwise play of the segments $h$, as the same are secured to the toggle-blocks $f$, permits the outward thrust of the segments to occur without hinderance or binding, these segments, through the limited play at their fastenings, readjusting themselves to the enlargement in perimeter as the outward thrust occurs. By reason of the firm bearing which is afforded both to the toggle-collar and to the toggle-blocks, in accordance with my invention, the action of the clutch becomes rigid and exact without lost motion or undue strain upon the parts, the driving-shaft A is not weakened by cutting the slots therein, while the relation of the rods $k$ to the shipper-collar $l$ and the toggle mechanism allows the clutch to be retained or controlled positively in both directions of the shift.

In accordance with the invention it will be seen that the toggle mechanism is carried by the driven wheel or drum and partakes only of the movements of said drum. Being thus carried, the drum or wheel is easily modified in structure, as already detailed, so that the toggle mechanism is stoutly supported by the wheel at its outer and inner ends. When engaging with the driver-wheel, the friction blocks or segments advance evenly and firmly about the entire circuit of the drum, contacting with the inner rim of the driver around the perimeter thereof, so that the toggle-arms act reciprocally to sustain each other and to withstand the shock through the common collar, which rests upon the driven hub.

Obviously the details of the structure may be varied within the skill of the mechanic without departing from the spirit of the invention, which is manifestly not limited to the precise elements in manner and form as heretofore set forth.

Although the invention has been shown and described in connection with a winding-drum, it is applicable in like manner to a driven wheel or pulley, and it is accordingly to be understood that the use of the term "drum" in the claims following is merely in way of description and not of limitation, said claims including the equivalents of such drum in combination the same as if they had been specified therein.

Having thus described my invention, what I claim as new, and desire to secure by Letters Patent, is—

1. The combination, with the supporting-shaft and with the driver-wheel having a friction-flange thereon, of the driven drum and its projecting hub, the toggle-collar set upon said projecting hub, the toggle-arms secured to said collar, and the toggle-blocks carried by said arms and having friction-faces to engage with the flange of the driver-wheel, substantially as described.

2. The combination, with the supporting-shaft, of the drum and its projecting hub mounted thereon, the collar set upon said hub, the toggle-arms secured to said collar, and the toggle-blocks carried by said arms, substantially as described.

3. The combination, with the supporting-shaft and with the drum mounted thereon, and having a projecting hub and recessed rim, of the collar set upon said hub, the toggle-arms secured to said collar, and the toggle-blocks carried by said arms and extending through the recesses in the flange of said drum, substantially as described.

4. The combination, with the supporting-shaft and with the driver-wheel having an inner friction-flange, of the driven drum having a projecting hub and recessed rim, the toggle-collar set upon said hub, the toggle-arms secured to said collar, and the toggle-blocks carried by said arms and extending through the recesses in the rim of said drum, substantially as described.

5. In friction-clutches, the combination, with the circumferential supporting-blocks, of the friction-segments secured thereto, and having limited endwise shift to compensate for the thrust of the supporting-blocks, substantially as described.

6. In friction-clutches, the combination, with the toggle-collar and the series of arms extending therefrom, of the supporting-blocks sustained thereby and the friction-segments bolted to said blocks with limited shift therein, substantially as described.

7. The combination, with the drum having the projecting hub and recessed rim, of the toggle-collar set upon said hub, the toggle-arms secured to said collar, the supporting-blocks carried by said arms, and the friction-segments extending through the recesses of said rim and secured to said blocks, substantially as described.

8. The combination, with the supporting-shaft and with the drum mounted thereon and having a projecting hub, of the shipper-collar, the connecting-rods, the toggle-collar set upon said hub, the toggle-arms secured to said collar, and the friction-blocks carried by said arms, substantially as described.

JOSEPH W. V. RAWLINS.

Witnesses:
MICHAEL FINN,
PHILIP SCHEUERMAN, Jr.